(12) United States Patent
Shivanand et al.

(10) Patent No.: US 12,411,612 B2
(45) Date of Patent: Sep. 9, 2025

(54) METHOD OF INCREASING FLASH ENDURANCE BY IMPROVED METADATA MANAGEMENT

(71) Applicant: SAMSUNG ELECTRONICS CO., LTD., Suwon-si (KR)

(72) Inventors: Srikanth Tumkur Shivanand, Karnataka (IN); Paul Justin Koilraj Jayakumar, Karnataka (IN); Sharath Kumar Kodase, Karnataka (IN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/603,941

(22) Filed: Mar. 13, 2024

(65) Prior Publication Data

US 2024/0256144 A1    Aug. 1, 2024

Related U.S. Application Data

(62) Division of application No. 16/432,287, filed on Jun. 5, 2019, now Pat. No. 11,960,729.

(30) Foreign Application Priority Data

Jun. 13, 2018  (IN) .............................. 201841022190

(51) Int. Cl.
*G06F 3/06* (2006.01)

(52) U.S. Cl.
CPC .......... *G06F 3/0616* (2013.01); *G06F 3/0647* (2013.01); *G06F 3/0659* (2013.01); *G06F 3/0679* (2013.01)

(58) Field of Classification Search
CPC .... G06F 3/0616; G06F 3/0647; G06F 3/0659; G06F 3/0679; G06F 3/0656;
(Continued)

(56) References Cited

U.S. PATENT DOCUMENTS 8,402,205 B2   3/2013  Goss et al.
8,996,797 B1   3/2015  Zheng et al.
(Continued)

FOREIGN PATENT DOCUMENTS

JP   2011-187078   9/2011
KR   10-1740962    5/2017
(Continued)

OTHER PUBLICATIONS

NVMe Driver, Intel, Apr. 2017, https://spdk.io/doc/nvme.html (Year: 2017).

(Continued)

*Primary Examiner* — Michael Krofcheck
(74) *Attorney, Agent, or Firm* — Fish & Richardson P.C.

(57) ABSTRACT

A method includes updating a first metadata log in an NVRAM of a host device corresponding to one or more recent input/output (I/O) operations received by the host device, periodically checking whether the size of the updated first metadata log is greater than a flush limit maintained in the host device, triggering a meta flush thread when the updated first metadata log size exceeds the flush limit maintained in the host device, sending, by a non-volatile memory express (NVMe) driver, a first command for synchronizing the updated first metadata log to one or more solid state drives (SSDs) for updating a second metadata log in the one or SSDs, and discarding, by the host device, metadata of the first metadata log updated in the host device after receiving a second command for acknowledging synchronization completion from the one or more SSDs.

11 Claims, 13 Drawing Sheets

(58) Field of Classification Search
CPC ...... G06F 3/0688; G06F 3/064; G06F 3/0653; G06F 11/3034; G06F 11/3065; G06F 3/0604; G06F 3/0689; G06F 12/0246; G06F 12/0292; G06F 2212/1016; G06F 2212/1036

See application file for complete search history.

(56) References Cited

U.S. PATENT DOCUMENTS

| | | | | |
|---|---|---|---|---|
| 9,229,854 | B1* | 1/2016 | Kuzmin | ............ G06F 3/0679 |
| 2008/0183963 | A1 | 7/2008 | He et al. | |
| 2010/0070729 | A1 | 3/2010 | Ng et al. | |
| 2011/0231596 | A1 | 9/2011 | Goss et al. | |
| 2014/0059271 | A1 | 2/2014 | Meir et al. | |
| 2014/0195725 | A1* | 7/2014 | Bennett | ............ G06F 12/0246 |
| | | | | 711/103 |
| 2014/0244901 | A1 | 8/2014 | Panda et al. | |
| 2016/0342509 | A1* | 11/2016 | Kotte | ............ G06F 12/0246 |
| 2016/0364142 | A1 | 12/2016 | Kanno | |
| 2017/0068686 | A1* | 3/2017 | Broido | ............ G06F 16/183 |
| 2017/0097873 | A1 | 4/2017 | Krishnamachari et al. | |
| 2019/0050341 | A1 | 2/2019 | Veal et al. | |
| 2019/0146925 | A1* | 5/2019 | Li | ............ G06F 12/0246 |
| | | | | 711/103 |

FOREIGN PATENT DOCUMENTS

| | | |
|---|---|---|
| KR | 10-2018-0059201 | 6/2018 |
| KR | 10-2018-0061851 | 6/2018 |

OTHER PUBLICATIONS

NVMe Driver, Intel, Apr. 2017, https://spdk.io/doc/nvme_8h.html, date from archive.org: https://web.archive.org/web/20170415223405/ https://spdk.io/doc/nvme_8h .html (Year: 2017).
Office Action in Korean Appln. No. 10-2018-0097890, mailed on Feb. 15, 2023, 19 pages (with English translation).
Office Action in Korean Appln. No. 10-2018-0097890, mailed on May 15, 2023, 20 pages (with English translation).
The American Heritage Dictionary of the English Language, Houghton Mifflin Harcourt, 2020, https://www.ahdictionary.com/word/search.html?q=host (Year: 2020).

* cited by examiner

FIG. 4A

Host Device (204)

| V_LBA | P_LBA |
|---|---|
| 1 | 1 |
| 2 | 2 |
| 3 | 3 |
| 4 | 4 |
| 5 | 5 |
| 6 | 6 |
| 7 | 7 |
| 8 | 8 |
|  | 9 |
|  | 10 |

FIG. 4B

SSD (210)

| LBA | PBA |
|---|---|
| 1 | 2 |
| 2 | 6 |
| 3 | 9 |
| 4 | 3 |
| 5 | 1 |
| 6 | 7 |
| 7 | 8 |
| 8 | 10 |
| 9 | 5 |
| 10 | 4 |

| Host Device | |
|---|---|
| V_LBA | P_LBA |
| 1 | 1 |
| 2 | 2 |
| 3 | 3 |
| 4 | 4 |
| 5 | 5 |
| 6 | 6 |
| 7 | 7 |
| 8 | 8 |
|  | 9 |
|  | 10 |

| SSD | |
|---|---|
| LBA | PBA |
| 1 | 5 |
| 2 | 6 |
| 3 | 9 |
| 4 | 3 |
| 5 | 1 |
| 6 | 7 |
| 7 | 8 |
| 8 | 10 |
| 9 | 2 |
| 10 | 4 |

406

METHOD OF INCREASING FLASH ENDURANCE BY IMPROVED METADATA MANAGEMENT

CROSS-REFERENCE TO RELATED APPLICATION

This application is a divisional of U.S. application Ser. No. 16/432,287, filed Jun. 5, 2019, which claims priority under 35 U.S.C. § 119(e) to Indian Patent Application No. 201841022190 filed on Jun. 13, 2018, in the Indian Patent Office, the entire contents of each are incorporated herein by reference.

BACKGROUND

The present invention generally relates to storage systems, and more particularly relates to a method of increasing flash endurance by improved metadata management.

Solid state storage devices, also known as solid state drives (SSDs), have been growing in popularity. The SSDs employ solid state memory to store data. The SSDs generally have no moving parts and therefore may not suffer from the mechanical limitations of conventional hard disk drives. An all flash array is a solid-state storage disk system that contains a plurality of flash memory drives. The flash memory is a type of non-volatile memory that can be erased and re-programmed in units of memory called blocks. The flash array can transfer data to and from solid state drives much faster than electromechanical disk drives and it is capable of writing data, erasing memory blocks, and performing random I/O operations in a single action or 'flash.' The memory block comprises of a set of storage locations for storing the write data. While storing the write data, metadata indicating the location of write data in the solid-state drive is maintained in the flash memory.

In the "All Flash Array," the metadata is huge and it is placed in the SSD itself. The metadata is updated frequently and a copy of metadata is cached in non-volatile random-access memory (NVRAM). Even though, the metadata is cached in NVRAM, it has to be flushed to the SSD periodically. Thus, this frequent metadata update result in flash wear out and degrades the performance.

FIG. 1 is a schematic illustration of traditional metadata management. Consider a scenario in which a recent request for an input/output (I/O) operation (e.g., a WRITE operation) is received by a host device. Host metadata (e.g., in a metadata log) corresponding to the received I/O operation is maintained in a nonvolatile random-access memory (NVRAM) of the host device. When the NVRAM overflows, the host device flushes the host metadata to one or more SSDs. The one or more SSDs, in turn, maintains the host metadata of the input/output (I/O) operation. Thus, the host metadata has to be maintained in both the host device and the one or more SSDs for the recent I/O operation. The above-mentioned scenario requires a logical to physical (L2P) mapping in the host device and the one or more SSDs and causes an overhead in the one or more SSDs due to inefficient metadata management.

Some optimization of caching and write buffering is done to improve the performance but it will not avoid the substantial metadata flush which will happen. Further, there are many essential operations like Rebuild, Snapshot, Compression, Volume management, etc. are tied to metadata. Currently, there is no method to avoid metadata management at the enterprise storage front.

FIG. 6 illustrates an existing method for volume management in one or more SSDS. In existing methods, the one or more SSDs store data using page-wise mapping. Page-wise mapping refers to mapping of data page-wise (e.g., each page comprising 4 kB). Since the one or more SSDs perform page-wise mapping, a lot of complexity occurs for the volume management.

FIG. 10 is a schematic diagram illustrates an existing rebuild method. Consider a scenario, in logic structure merge (LSM) systems, in which stripe mapping includes storing different block numbers across one or more SSDs. Since the stripe mapping includes storing the different block numbers across the one or more SSDs, involvement of the host device is mandatory to perform logical to physical (L2P) mapping in the host device in order to recover metadata from an old disk and rebuild the metadata on a new disk.

In view of the foregoing, there is a need for a method that provides intelligent solutions to the hereinabove mentioned challenges.

SUMMARY

Various embodiments herein describe a method for increasing flash endurance by improved metadata management.

According to one aspect, a method includes: updating a first metadata log in a non-volatile random-access memory (NVRAM) of a host device corresponding to one or more recent input/output (I/O) operations received by the host device to produce an updated first metadata log; periodically checking, by the host device, whether the size of the updated first metadata log is greater than a flush limit maintained in the host device; triggering a meta flush thread when the size of the updated first metadata log is greater than the flush limit maintained in the host device; sending, by a non-volatile memory express (NVMe) driver of the host device, a first command for performing synchronization of the updated first metadata log from the host device to one or more solid state drives (SSDs) for updating a second metadata log in the one or more SSDs corresponding to the one or more recent I/O operations; transmitting, by the one or more SSDs, a second command for acknowledging synchronization completion to the host device once the synchronization of the second metadata log is completed in a volume block mapping table of the one or more SSDs; and discarding, by the host device, metadata of the first metadata log in the host device once the second command is received by the host device from the one or more SSDs.

According to some embodiments, the first command is a flip command adapted for exchanging one or more first physical blocks, which are old blocks, with one or more second physical blocks, which are new blocks, in the one or more SSDs.

According to some embodiments, the first command is a flip command which includes information of one or more physical blocks to be exchanged or modified in the one or more SSDs.

According to some embodiments, the first command is further configured to: perform a logical to physical (L2P) mapping in the volume block mapping table of the one or more SSDs from the updated first metadata log of the host device, and update the second metadata log in the one or more SSDs based on the logical to physical mapping performed corresponding to the one or more recent input/output operations.

According to some embodiments, the method includes: the host device preparing a list of one or more physical blocks that needs to be exchanged in the one or more SSDs; the host device providing the prepared list of one or more physical blocks to the NVMe driver of the host device for preparing the first command; and the NVMe driver of the host device constructing the first command in response to the prepared list.

According to some embodiments, the method further includes updating, by the one or more SSDs, the list of one or more physical blocks to be exchanged in the second metadata log maintained in the volume block mapping table of the one or more SSDs.

According to some embodiments, the metadata log maintained in the volume block mapping table of the one or more SSDs is configured for performing operations comprising at least one of volume management (VM), garbage collection, redundant array of independent disks (RAID) rebuild, snapshot, and compression in the one or more SSDs.

According to some embodiments, discarding the metadata log table in the host device discards garbage collection metadata in the host device.

According to some embodiments, discarding the metadata log in the host device discards a logical to physical (L2P) mapping in the host device.

According to some embodiments, discarding the logical to physical mapping in the host device enables performing a redundant array of independent disks (RAID_rebuild in a simpler way using a generic code.

According to some embodiments, the host device includes a volume block table and holds only a NAND erasable block address list.

According to some embodiments, the host device only holding the NAND erasable block address list enables the host device to perform at least one of: storing the volume block table in the NVRAM, synchronizing the first updated metadata log from the host device to the one or more SSDs and discard the metadata log in the host device once the synchronization is completed in the one or more SSDs.

According to some embodiments, updating the second metadata log in the one or more (SSDs comprises synchronizing the first metadata log from the host device in a control memory buffer (CMB) area of the one or more SSDs.

In another aspect, a method for increasing flash endurance by improved metadata management while performing volume management VM read I/O operations includes: retrieving a physical logical block address from a first metadata log in an NVRAM of a host device utilizing a virtual logical block address that is associated with the VM read I/O operations; verifying whether the retrieved physical logical block address is present in a second metadata log of one or more SSDs; providing access to disks of one or more SSDs when the physical logical block address retrieved is present in the second metadata log of the one or more SSDs; computing the physical logical block address from a volume block mapping table of the one or more SSDs when the physical logical block address is not present in the second metadata log of the one or more SSDs, verifying whether the computed physical logical block address is valid; providing access to disks of one or more SSDs when the physical logical block address is valid; and returning zeroed data when the computed physical logical block address is not valid.

In still another aspect, a method for increasing flash endurance by improved metadata management while performing virtual memory (VM) write I/O operations includes: computing, by the host device, a volume address base and a volume address offset by utilizing a volume block table in an NVRAM of the host device to identify an exact page address for writing data; retrieving, by the host device, a physical logical block address from the volume block table in the NVRAM; verifying whether the retrieved physical logical block address is valid; obtaining a free page for writing the data and updating an associated physical logical block address in a metadata log of the one or more SSDs when the physical logical block address is valid and providing access to disks of one or more SSDs for writing the data and creating or modifying at least one of the virtual logical block address and the physical logical block address in the metadata log of the one or more SSDs corresponding to the data written.

According to some embodiments, the method includes: allocating a stripe of chunk size to the physical block address retrieved when the physical logical block address is invalid; and creating a new mapping entry in a volume block mapping table in the one or more SSDs and providing access to the disks of the one or more SSDs for writing the data.

In yet another aspect, a method for increasing flash endurance by improved metadata management while performing a redundant array of independent devices (RAID) rebuild includes: extracting, by one or more SSDs of the RAID, data for every logical address in a volume block mapping table of the one or more SSDs when the rebuild of the RAID is performed; reading, by the one or more SSDs, data from disks of the one or more SSDs excluding corrupted disks; computing, by the one or more SSDs, lost data using at least one of the data from the valid SSDs and the data from the SSDs newly connected in the RAID; and writing, by the one or more SSDs, the data into the SSDs newly connected in the RAID, utilizing the same logical address from the volume block mapping table.

According to some embodiments, the method includes employing peer-to-peer communication between the one or more SSDs to recover the data without action by the host device.

According to some embodiments, the logical address of the disks in the one or more SSDs forms parity group exactly with the logical address from the disks of the SSDs newly connected in the RAID to write the data into the new disks.

In a further aspect of the invention, a method comprises: a host device receiving a request for a data input/output (I/O) operation for one or more solid state devices (SSDs) which are connected to the host device; the host device using a virtual address associated with the I/O operation to retrieve a physical address from a first metadata log stored in the host device; and verifying whether the retrieved physical address exists in a second metadata log of the one or more SSDs. When it is determined that the retrieved physical address does not exist in the second metadata log of the one or more SSDs, the method includes computing the physical address from a volume block mapping table in the host device and verifying whether the computed physical address is valid. When it is determined that the computed physical address is not valid, the method includes returning zeroed data, and when it is determined that the computed physical address is valid, the method includes providing access to one or more disks of the one or more SSDs. When it is determined that the retrieved physical address exists in the second metadata log of the one or more SSDs, providing the access to the one or more disks of the one or more SSDs.

In some embodiments, the one or more SSDs comprise a plurality of SSDs configured as a redundant array of independent devices.

In some embodiments, the first metadata log is stored in a nonvolatile random access memory (NVRAM) of the host device.

In some embodiments, the host device is configured to store a volume mapping table in a nonvolatile random access memory (NVRAM) of the host device, wherein the volume mapping table maps virtual logical block addresses to physical logical block addresses.

The foregoing has outlined, in general, various aspects of the invention and is to serve as an aid to better understand the more complete detailed description which is to follow. In reference to such, there is to be a clear understanding that the present invention is not limited to the specific methods or applications of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

The other objects, features and advantages will occur to those skilled in the art from the following description of the preferred embodiment and the accompanying drawings.

FIGS. 4A, 4B, 4C, 4D, 4E and 4F illustrate an embodiment of a sequential method of updating metadata log in one or more SSDs.

Figure 1:
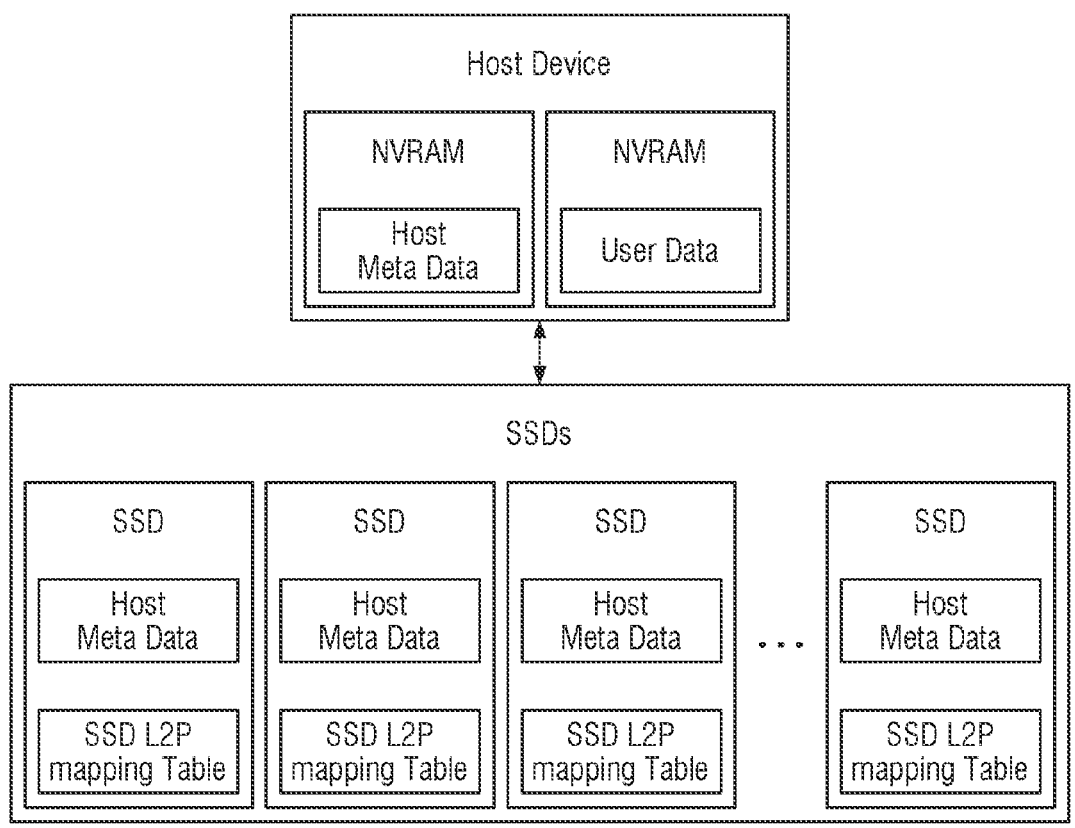
FIG. 1 is a schematic illustration of traditional metadata management.

Although specific features of the present invention are shown in some drawings and not in others, this is done for convenience only as each feature may be combined with any or all of the other features in accordance with the present invention.

DETAILED DESCRIPTION

This disclosure describes a method of increasing flash endurance by improved metadata management. In the following detailed description, reference is made to the accompanying drawings that form a part hereof, and in which are shown by way of illustration specific embodiments in which the invention may be practiced.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The present invention describes a method for increasing flash endurance in one or more solid state drives (SSDs) by improved metadata management. According to the above-mentioned drawbacks illustrated in the background of the invention, the method for improved metadata management is proposed for increasing the flash endurance and the lifetime of the one or more SSDs.

Figure 2:
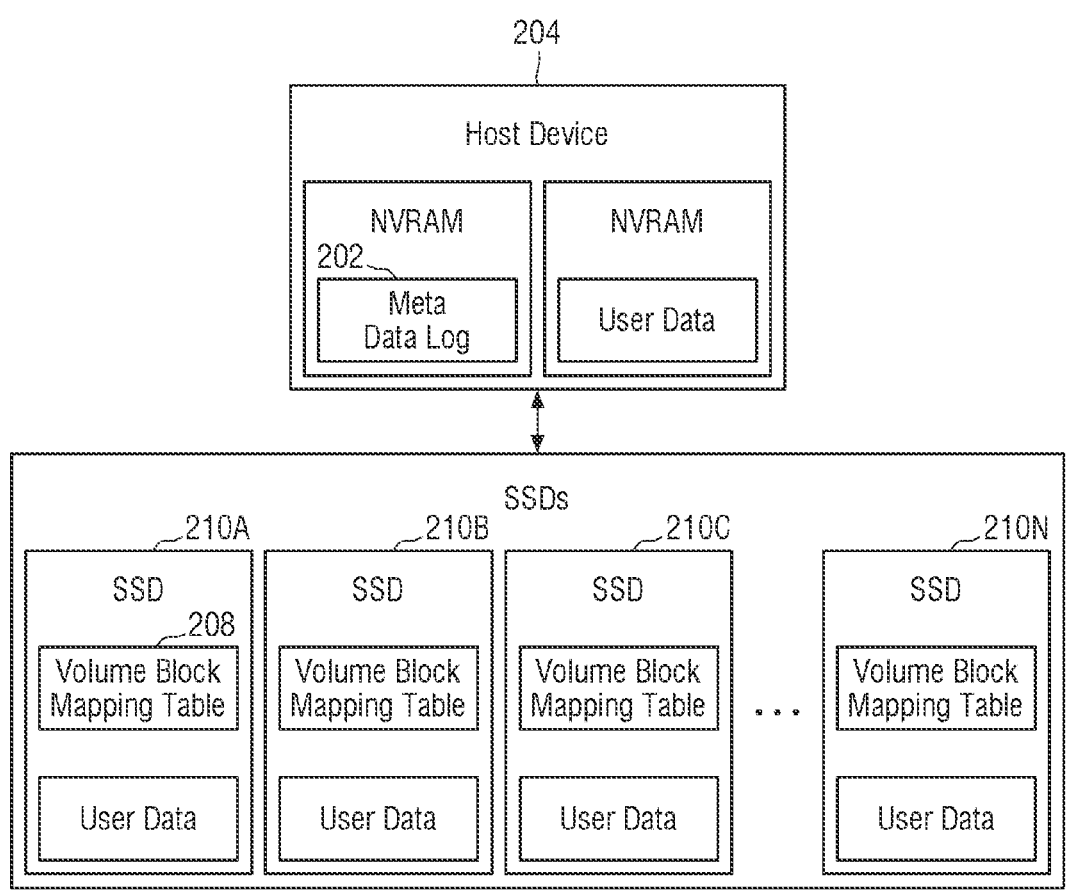
FIG. 2 is a schematic diagram illustrating an embodiment of a method for increasing flash endurance in one or more solid state drives (SSDs) by improved metadata management.

FIG. 2 is a schematic diagram illustrating a method for increasing flash endurance in one or more SSDs 210A-N by improved meta data management, according to an embodiment of the present invention. FIG. 2 provides a solution of improved metadata management for a scenario as described in FIG. 1. Host device 204 updates and manages a first metadata log 202 corresponding to one or more recent requests for input/output (I/O) operations received by host device 204. Host device 204 triggers a meta flush thread when first metadata log 202 exceeds a flush limit maintained in host device 204. The triggering of the meta flush thread further includes preparing a list of blocks that are to be exchanged.

Host device 204 communicates the list of blocks prepared to an NVMe driver (see FIG. 3, below) of host device 204 for preparing a first command. In an embodiment, the first command prepared is a flip command. The NVMe driver then communicates the first command to one or more SSDs for performing syncing of first metadata log 202 and updating a second metadata log in one or more SSDs 210A-N corresponding to the I/O operations. One or more SSDs 210A-N communicates a second command for acknowledging synchronization completion to host device 204. Host device 204 discards metadata of first metadata log 202 once the second command is received from one or more SSDs 110A-N, thereby reducing the overhead of maintaining metadata in host device 204.

Figure 3:
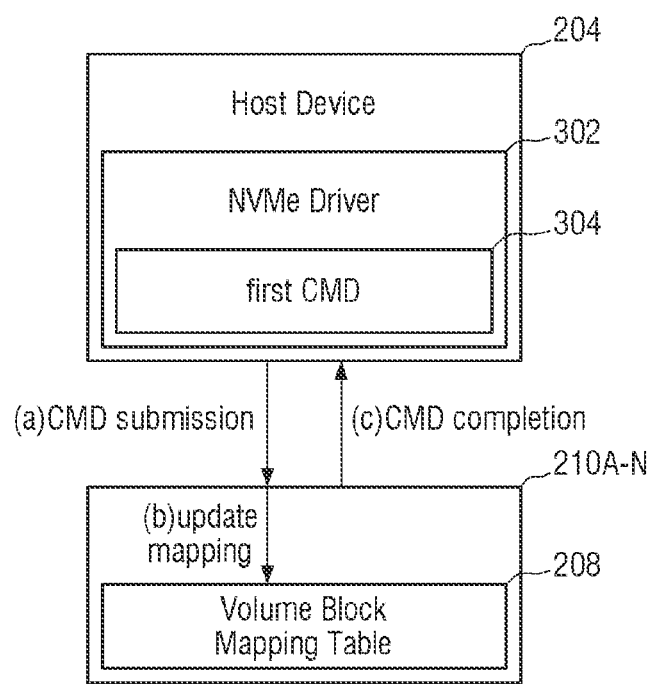
FIG. 3 is a schematic diagram illustrating metadata management for increasing flash endurance utilizing a first command, according to an embodiment of the present invention.

FIG. 3 is a schematic diagram illustrating an embodiment of metadata management utilizing a first command. Host device 204 updates and manages metadata log upon receiving one or more recent input/output (I/O) operations by host device 204. Host device 204 maintains a flush limit for the metadata log within host device 204. Host device 204 periodically checks whether the metadata log is exceeding the flush limit. Host device 204 triggers a meta flush thread when the metadata log exceeds the flush limit. The triggering of the meta flush thread further includes preparing a list of blocks that are to be flipped during a flush operation. Host device 204 shares the prepared list of blocks with an NVMe driver 302.

NVME driver 302 prepares a first command 304 and transmits first command 304 to one or more SSDs 210A-N for updating metadata log in one or more SSDs 210A-N corresponding to first metadata log 202 updated in host device 204 for the one or more recent I/O operations received. In an embodiment, first command 304 is a flip command. First command 304 includes information of the list of the blocks that are to be exchanged. First command 304 further exchanges one or more first physical blocks of corresponding old blocks with one or more second physical blocks of corresponding new blocks.

One or more SSDs 210A-N update the metadata log and maintain a volume block mapping table 208 inside one or more SSDs 210A-N. One or more SSDs 210A-N receives first command 304 from NVMe driver 302. One or more SSDs 210A-N update volume block mapping table 208 accordingly and transmits back a second command for acknowledging synchronization completion to host device 204 and for causing host device 204 to discard the metadata in first metadata log 202 maintained in host device 204. Host device 204 holds only erasable NAND address blocks lists once the metadata in first metadata log 202 is discarded, thereby a memory requirement of a volume block table in the NVRAM of the host device is optimized. The optimized memory requirement of the volume block table enables to store the volume block table in the NVRAM of the host device and eliminates need of flushing the entire metadata log to the one or more SSDs.

Figure 4C:
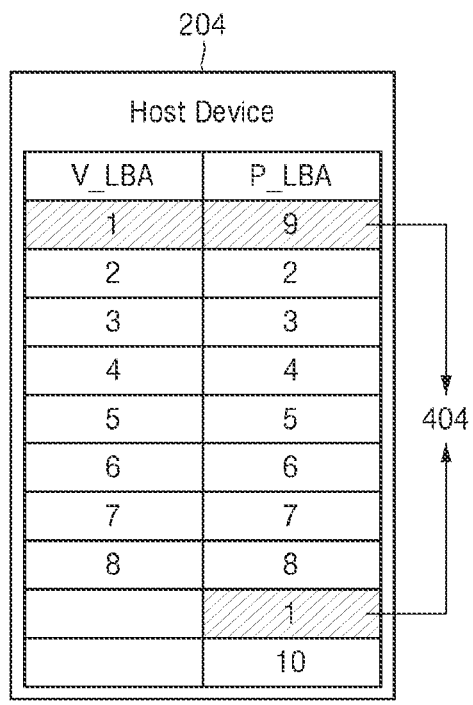

FIGS. 4A to 4F illustrate an embodiment of a sequential method of updating a second metadata log in one or more SSDs 210. Consider a scenario in which host device 204 receives an input/output operation of flipping a location of blocks of data (e.g., physical logical block addresses P_LBA 1 and P_LBA 9) as shown in FIG. 4A. Host device 204 includes virtual logical block addresses (V_LBA) and physical logical block addresses (P_LBA) within an NVRAM of host device 204. The virtual logical block addresses and the physical logical block addresses specify location of the blocks of the data stored in one or more SSDs 210. FIG. 4A depicts an initial first metadata log maintained in the NVRAM of the host device. FIG. 4B depicts an initial second metadata log maintained in one or more SSDs 210.

Figure 4D:
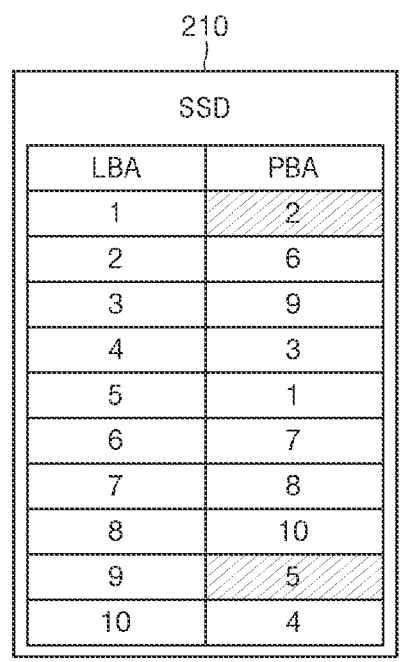

FIG. 4C depicts updated first metadata log 404 in the host device for the corresponding one or more recent I/O operations (e.g., flipping of location of the blocks) received. FIG. 4D depicts corresponding mapping maintained in one or more SSDs 210 once a flip command is prepared by host device 204 and communicated to one or more SSDs 210 for performing flipping operation. FIG. 4E depicts the metadata in the first metadata log that are yet to be discarded by host device 204 once a second command acknowledging synchronization completion is received from one or more SSDs 210. FIG. 4F depicts exchange 406 of one or more first physical blocks of a corresponding old block with one or more second physical blocks of a corresponding new block (e.g., an updated second metadata log) in one or more SSDs 210 corresponding to the one or more recent I/O operations received.

Figure 5:
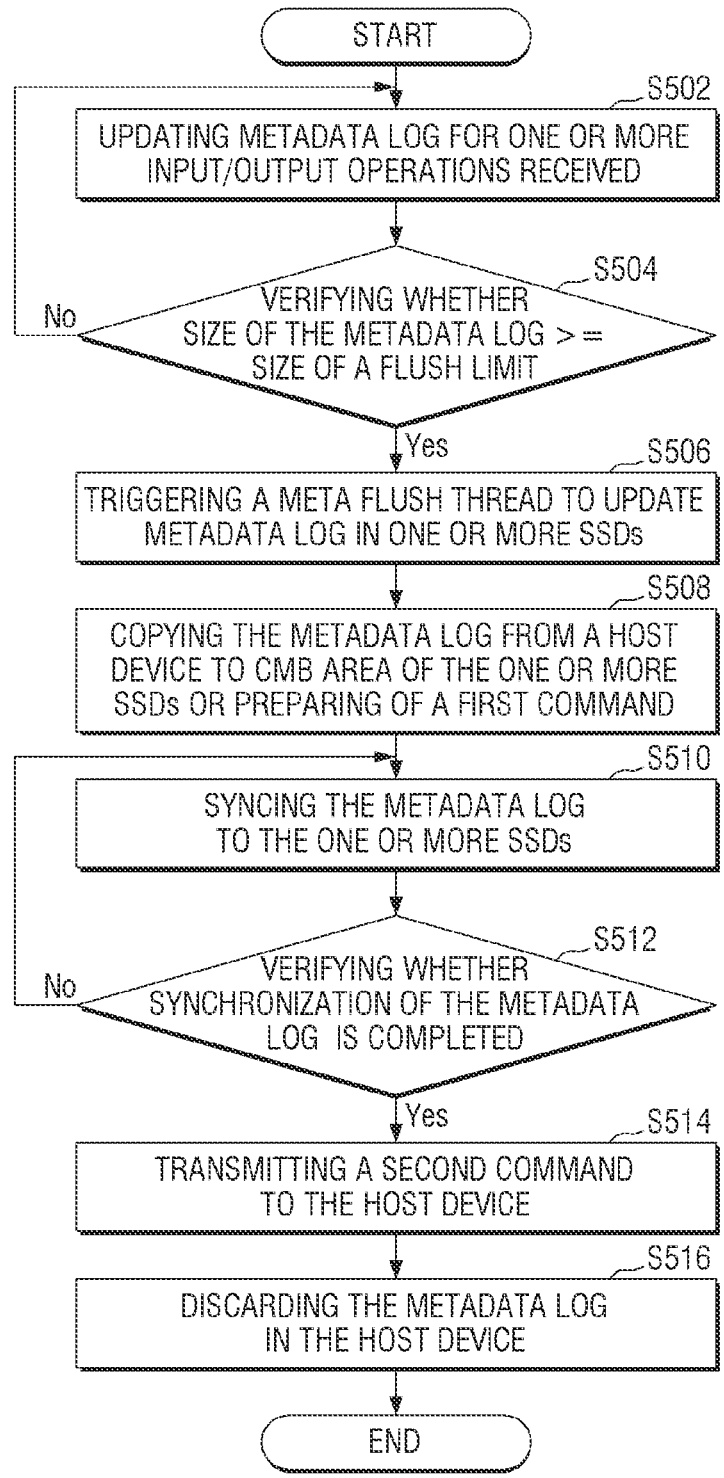
FIG. 5 is a flow chart illustrating an embodiment of a method of metadata management for increasing flash endurance.

FIG. 5 is a flow chart illustrating an embodiment of a method of metadata management for increasing flash endurance. At step S502, a first metadata log is updated for one or more input/output operations in host device 204. At step S504, a flush limit is verified periodically by host device 204 to determine whether the size of the updated first metadata log updated exceeds the size of the flush limit. When the answer at step S504 is "No," then operation returns to step 502. When the answer at step 505 is "Yes," then at step S506 a metadata flush thread is triggered by host device 204 to execute a flush operation. The flush operation includes flushing the metadata from the first metadata log from host device 204 to one or more SSDs 210.

At step S508, a first command is prepared by NVMe driver 302 of host device 204 or the first metadata log is copied into a controller memory buffer (CMB) area of one or more SSDs 210. At step S510, the first metadata log is synced to one or more SSDs 210A-N once the first command is communicated from NVMe driver 302 of host device 204 to one or more SSDs 210A-N. In an embodiment the first command prepared is a flip command. At step S512, one or more SSDS 210A-N verify periodically whether completion of the metadata log synchronization has occurred. At step S514, one or more SSDs 210A-N return a second command for acknowledging synchronization completion to host device 204. At step S516, the metadata in the first metadata log is discarded in host device 204. In one embodiment, one or more SSDs 210A-N wait for completion of synchronization of the metadata logs to send the second command to host device 204. In some embodiments, an NVRAM of a host device maintains a memory area which comprises a permanent metadata area, a metadata log area and a data area. The permanent metadata area further includes a volume block table.

Figure 6:
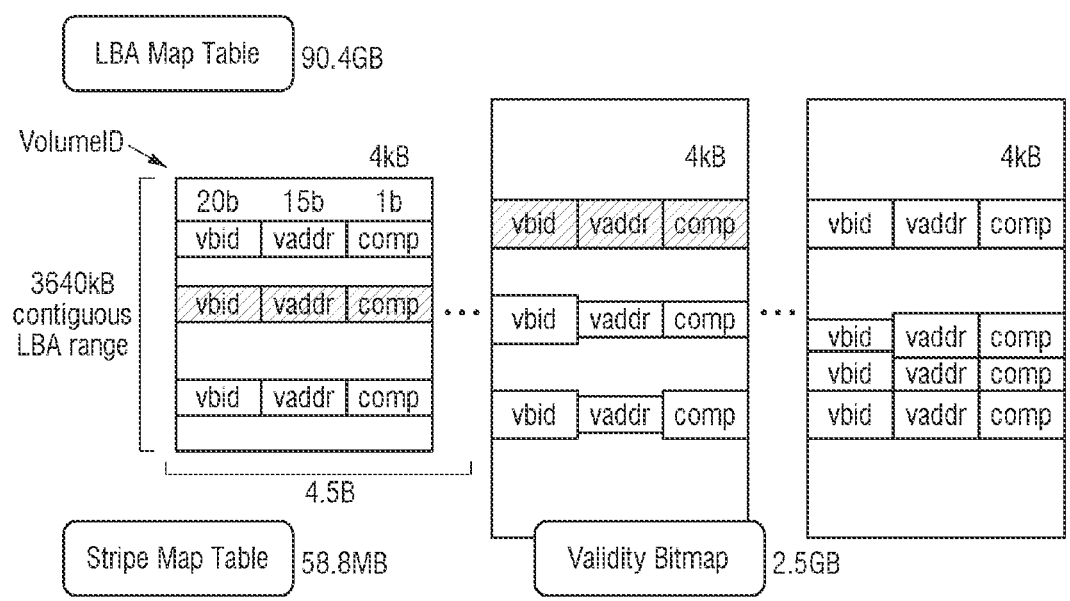
FIG. 6 is a schematic diagram illustrating an existing method for volume management in one or more SSDS.
Figure 7:
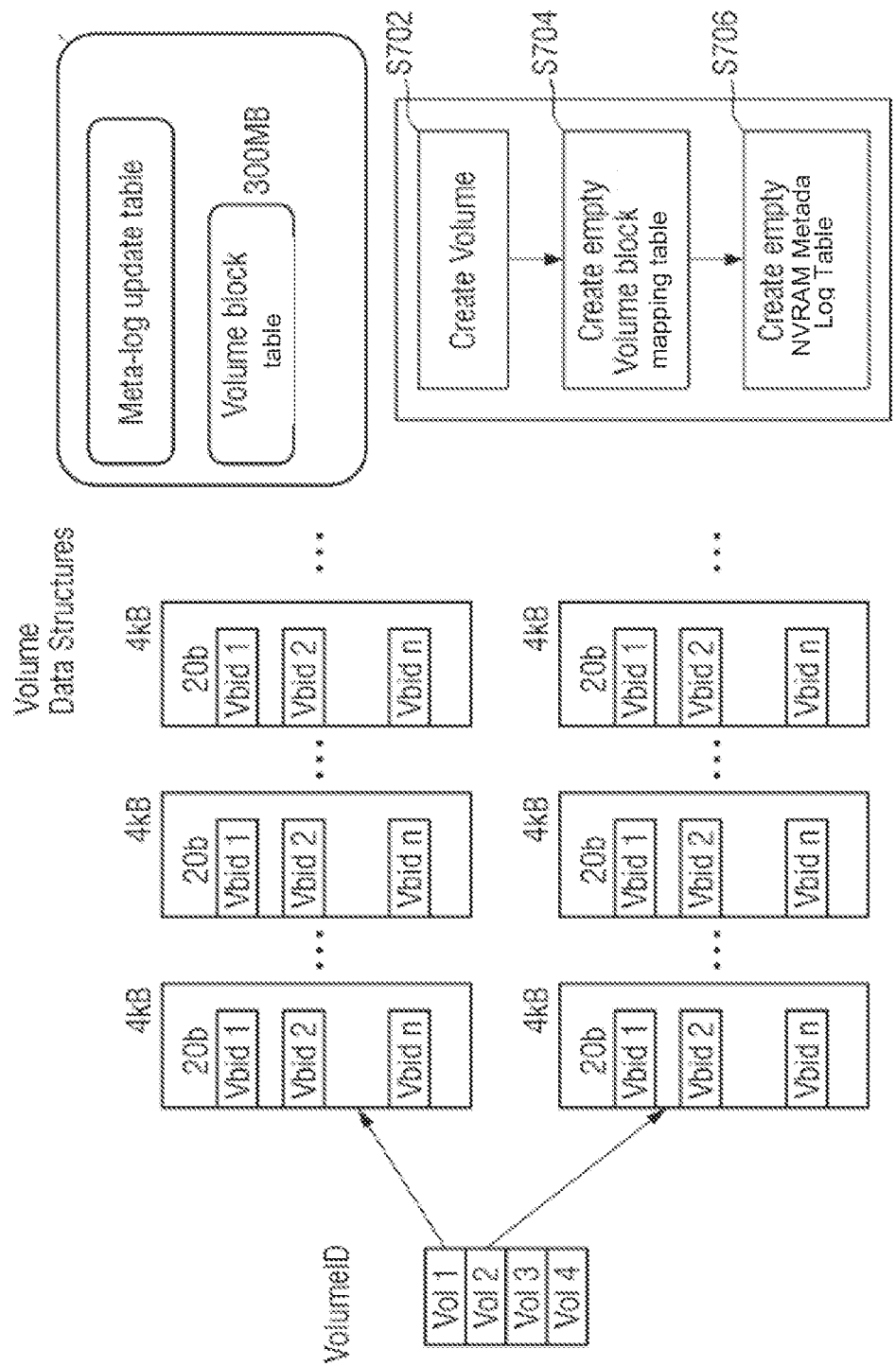
FIG. 7 is a schematic diagram illustrating an embodiment of a method of volume management for increasing flash endurance, according to an embodiment of the present invention.

FIG. 7 is a schematic diagram illustrating an embodiment of a method of volume management for increasing flash endurance. FIG. 7 provides a solution for a scenario described in FIG. 6. According to this embodiment, one or more SSDs 210A-N store data in a volume block mapping table using block address wise mapping (e.g., each comprising 4 kB) as depicted in FIG. 7. In an embodiment, the page address is a fixed offset to store the data via the block address wise mapping. The block address wise mapping minimizes the consumption of a volume in the one or more SSDs and hence reduces the complexity in the volume management. In an embodiment, at steps S702 and S704, the one or more SSDs create a volume by creating an empty volume block mapping table, and at step S706, subsequently creating an empty NVRAM metadata log table.

Figure 8:
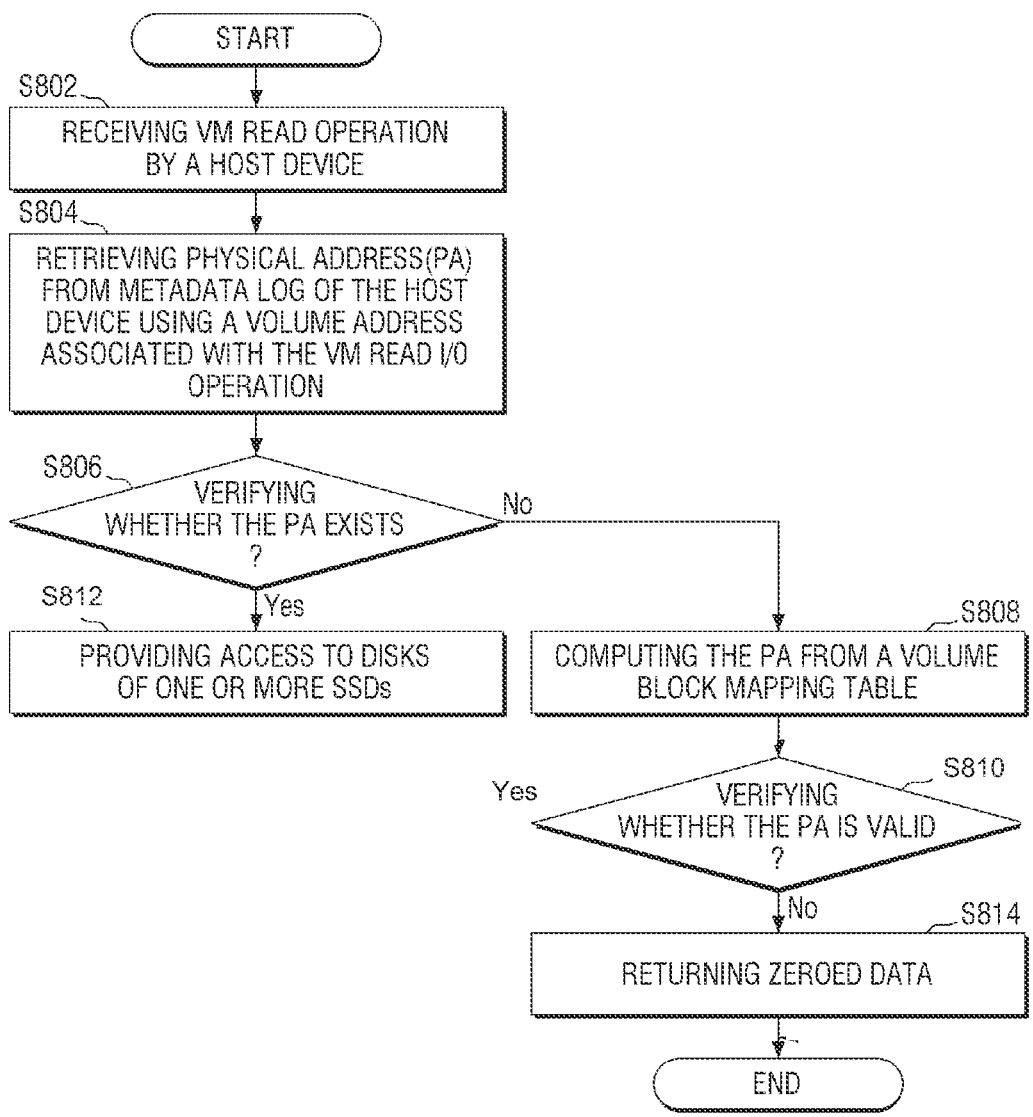
FIG. 8 is a flow chart illustrating an embodiment of a method for increasing flash endurance by improved metadata management while performing virtual memory (VM) read I/O operations.

FIG. 8 is a flow chart illustrating an embodiment of a method for increasing flash endurance by improved metadata management while performing virtual memory (VM) read I/O operations. At step S802, the VM read I/O operation is received by the host device. At step S804, a volume address (e.g. a virtual address) associated with the VM read I/O operation is used to retrieve a corresponding physical address (PA) from a first metadata log of the host device. At step S806, it is verified whether the corresponding retrieved physical address (PA) exists in a second metadata log of the one or more SSDs. If the answer at step S806 is "No" and the PA does not exist in the second metadata log of the one or more SSDs, then in step S808 a PA is computed from a volume block mapping table. At step S810 the computed PA is verified for validity. When a valid PA is confirmed, then at step S812 access to the disks of the one or more SSDs is provided. When a valid PA is not found, then in step S814 zeroed data is returned.

Figure 9:
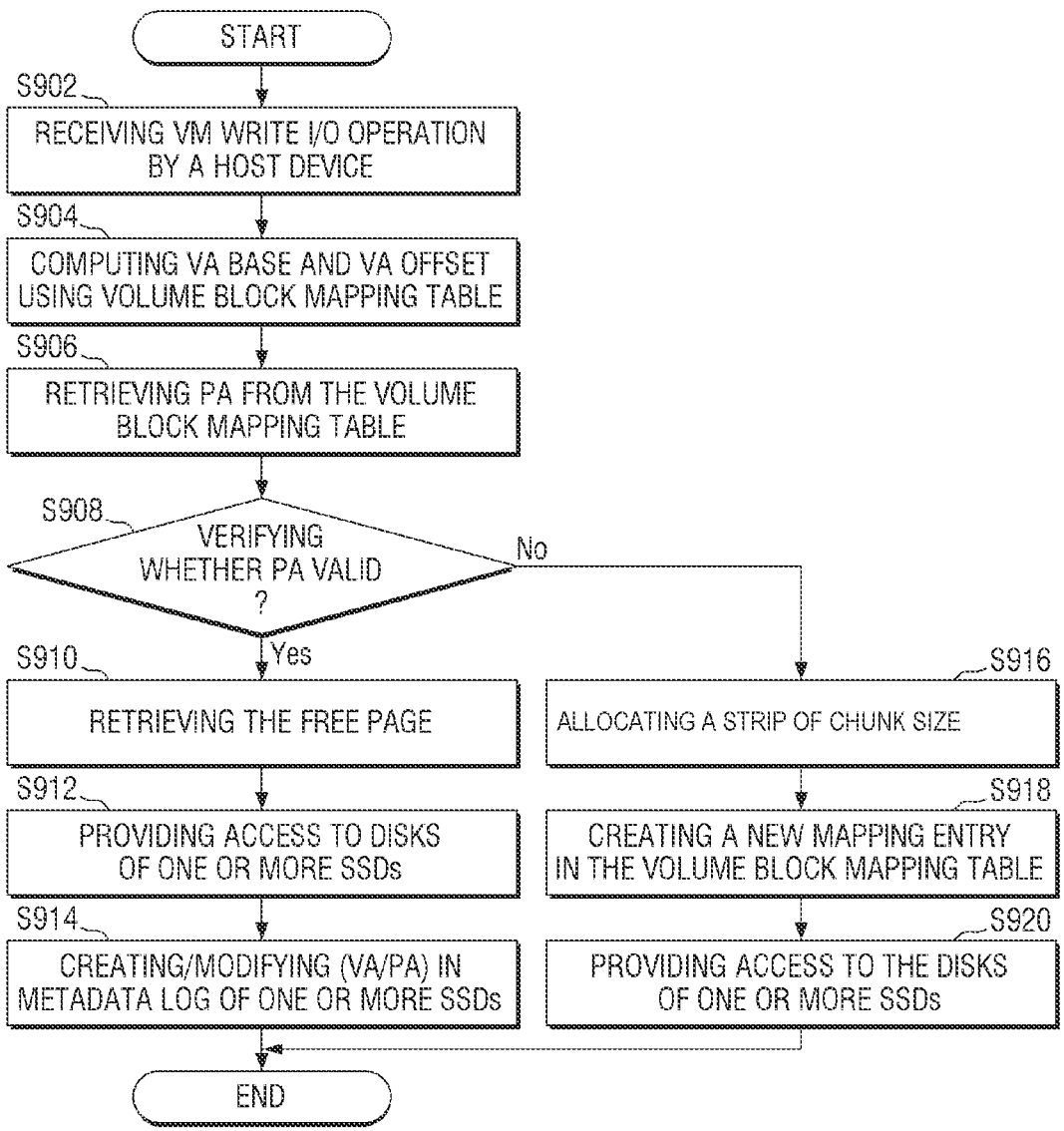
FIG. 9 is a flow chart illustrating an embodiment of a method for increasing flash endurance by improved metadata management while performing VM write I/O operations.

FIG. 9 is a flow chart illustrating an embodiment of a method for increasing flash endurance by improved metadata management while performing VM write I/O operations. At step S902, a volume management write I/O operation is received by host device 204. At step S904, a volume address base and a volume address offset are computed using a volume block mapping table in one or more SSDs 210A-N. At step S906, a physical address is retrieved from the volume block mapping table. At step S908, the retrieved PA is verified for validity.

When the retrieved PA at step S908 is found valid, then at step S910, a free page is obtained. At step S912, access to disks of one or more SSDs 210A-N is provided. At step 914, an associated physical address or volume address of the obtained free page is updated in the second metadata log of one or more SSDs 210A-N. When the PA is found not valid in step S908, then at step S916 a stripe of chunk size is allocated. At step S918, a new mapping entry in the volume block mapping table is created and an associated disk offset is used for user data copy. At step S920, access to disks of one or more SSDs 210A-N is provided finally.

Figure 10:
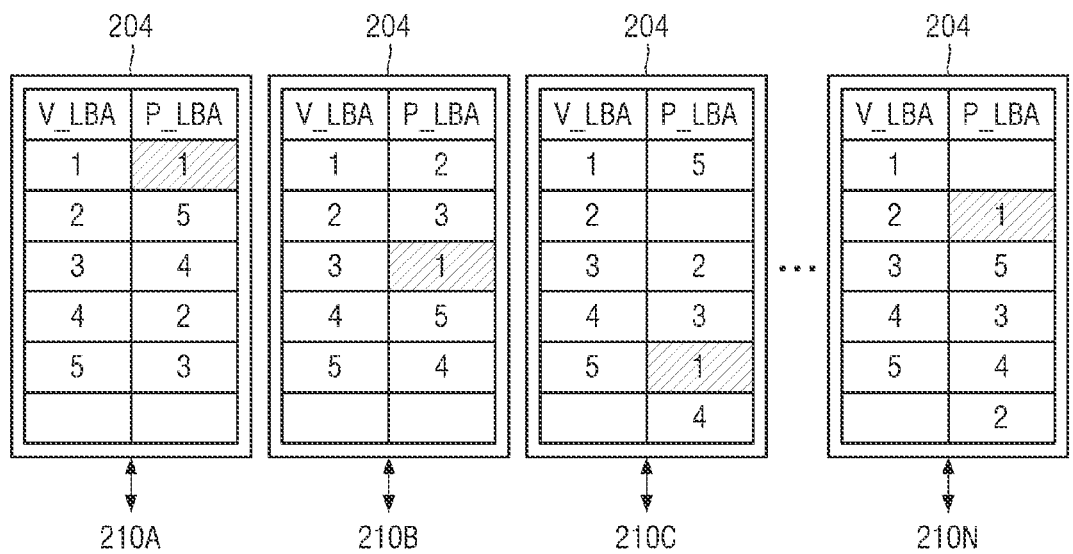
FIG. 10 is a schematic diagram illustrating an existing rebuild method.
Figure 11:
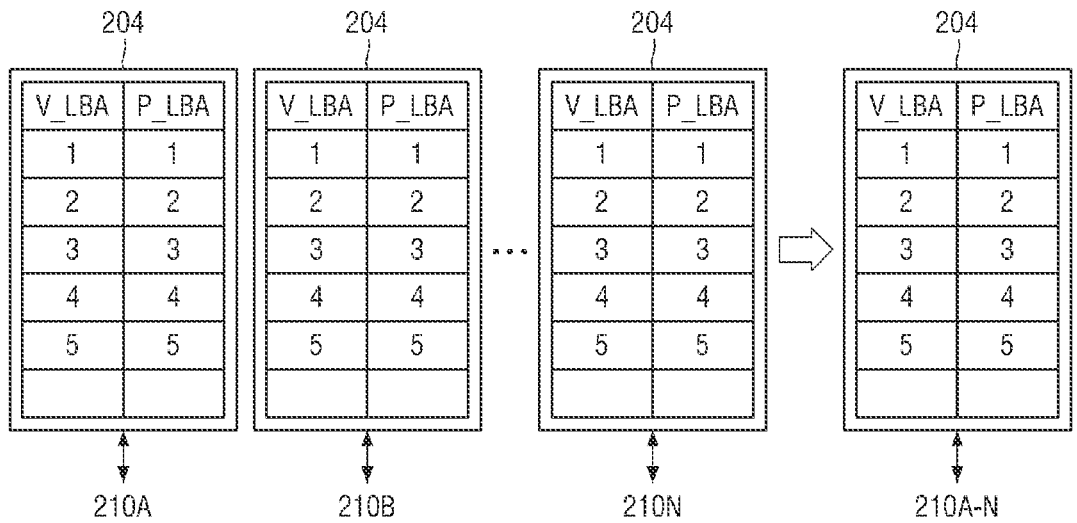
FIG. 11 is a schematic diagram illustrating an embodiment of a method for rebuild in one or more SSDs by improved metadata management.

FIG. 11 is a schematic diagram illustrating an embodiment of a method for rebuild in one or more SSDs. FIG. 11 provides a solution for a scenario as described in FIG. 10. According to this embodiment, one or more SSDs 210A-N maintain the same block numbers across one or more SSDs 210A-N. The same block numbers maintained across one or more SSDs 210A-N eliminates the need for logical to physical (L2P) mapping in the host device. Further the host device involvement is eliminated to recover data from an old disk and rebuild in a new disk. The rebuild may be performed in a simpler way using a generic code.

Figure 12:
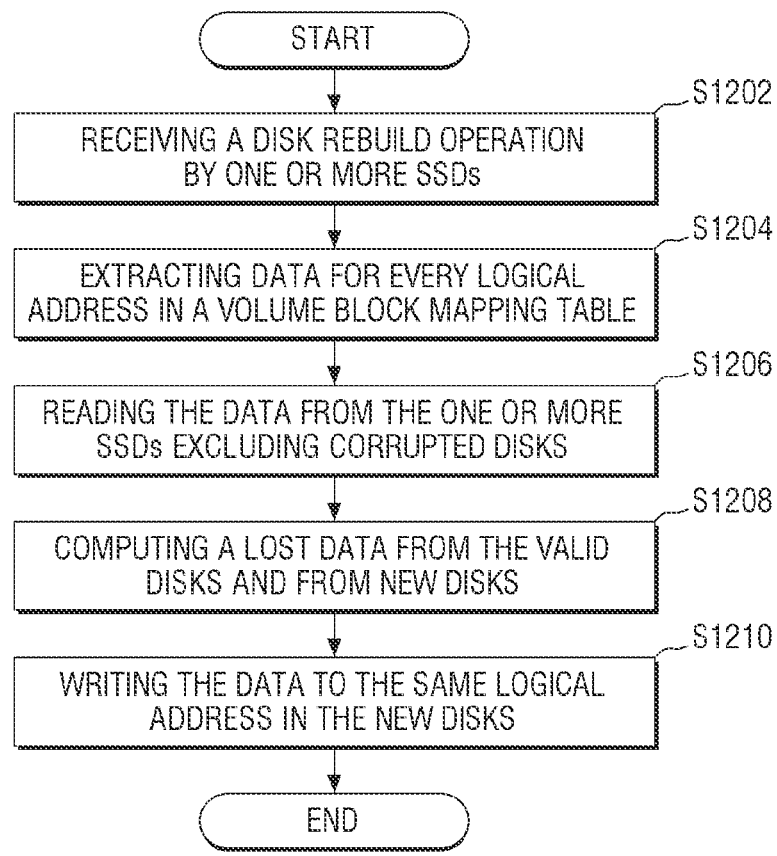
FIG. 12 is a flow chart illustrating an embodiment of a method for increasing flash endurance by improved metadata management while performing an SSD rebuild.

FIG. 12 is a flow chart illustrating an embodiment of a method for increasing flash endurance by improved metadata management while performing an SSD rebuild. At step S1202, a disk rebuild operation is received by one or more SSDs 210A-N. In an embodiment, the rebuild is performed using valid data from disks other than the corrupted disk. At step S1204, data is extracted for every logical address in a Volume block mapping table. At step S1206, the data is read from one or more SSDs 210A-N (excluding corrupt disk). At step S1208, lost data is computed using the data from the valid disks and from new disks (e.g. a spare disk) that are connected. At step S1210, the data is written into the new disks using the same logical address from the volume block mapping table. The rebuild method described may be performed independent of involvement of host device 204, as the logical to physical mapping in host device 204 is eliminated. In an embodiment, the rebuild is performed between one or more SSDs 210A-N in peer to peer communication. In another embodiment, the logical address of the disks forms parity group with exactly the logical address form the new disks.

Thus, embodiments described above enable a host device to prepare a special command called as "flip command" or to copy a first metadata log of the host device via "control memory buffer (CMB)" to sync a second metadata log in one or more of SSDs. The flip command or the CMB further enables the one or more of SSDs to exchange one or more first physical blocks corresponding to old blocks with one or more second physical blocks corresponding to new blocks. Therefore, the one or more SSDs update the list of blocks to be exchanged in a volume block mapping table maintained in the one or more SSDs. Finally, the host device discards the metadata in the first metadata log of the host device after receiving a second command indicating acknowledgement of synchronization completion from the one or more SSDs, thereby reducing metadata overhead, and increasing performance and life time of the one or more SSDs.

In the detailed description of the embodiments of the invention, reference is made to the accompanying drawings that form a part hereof, and in which are shown by way of illustration specific embodiments in which the invention may be practiced. Embodiments have been described above in sufficient detail to enable those skilled in the art to practice the invention. It is to be understood that other embodiments may be utilized and that changes may be made without departing from the scope of the present invention. The detailed description is, therefore, not to be taken in a limiting sense, and the scope of the present invention is defined only by the appended claims.

What is claimed is:

1. A method of performing a volume management (VM) write input/output (I/O) operation at a host device connected to one or more solid state drives (SSDs), the method comprising:
    computing a volume address base and a volume address offset based on a volume block table in a non-volatile random-access memory (NVRAM) of the host device to identify an exact page address in the one or more SSDs for writing data;
    retrieving a physical logical block address from the volume block table in the NVRAM;
    verifying whether the physical logical block address is valid;
    obtaining a free page for writing the data and updating an associated physical logical block address in a metadata log of the one or more SSDs based on verifying that the physical logical block address is valid; and
    providing access to disks of the one or more SSDs for:
        writing the data as written data; and
        creating or modifying at least one of a virtual logical block address or the physical logical block address of the free page in the metadata log of the one or more SSDs corresponding to the written data.

2. The method of claim 1, further comprising:
    receiving, a VM write I/O operation,
    wherein the volume address base and the volume address offset are computed based on receiving the volume management write I/O operation.

3. The method of claim 1, further comprising:
allocating a stripe of chunk size to the physical logical block address and verifying that the physical logical block address is invalid;
creating a new mapping entry in a volume block mapping table in the one or more SSDs based on allocating the stripe of chunk size; and
providing access to the disks of the one or more SSDs for writing the data based on the new mapping entry.

4. The method of claim 3, wherein a disk offset for a user data copy is associated with the new mapping entry.

5. The method of claim 1, wherein the one or more SSDs includes a plurality of SSDs configured as a redundant array of independent disks (RAID).

6. An apparatus for performing a volume management (VM) write input/output (I/O) operation at a host device, the apparatus configured to:
receive a request for a data input/output (I/O) operation for one or more solid state devices (SSDs) connected to the host device;
retrieve a physical address from a first metadata log stored in the host device based on a virtual address associated with the data I/O operation;
determine whether the physical address exists in a second metadata log of the one or more SSDs;
compute the physical address from a volume block mapping table in the host device as a computed physical address based on determining that the physical address does not exist in the second metadata log of the one or more SSDs;
verify whether the computed physical address is valid; and
provide access to one or more disks of the one or more SSDs based on the computed physical address in response to verifying that the computed physical address is valid.

7. The apparatus of claim 6, further configured to:
provide the access to the one or more disks of the one or more SSDs based on determining that the physical address exists in the second metadata log of the one or more SSDs.

8. The apparatus of claim 6, further configured to:
return zeroed data based on verifying that the computed physical address is not valid.

9. The apparatus of claim 6, wherein the one or more SSDs includes a plurality of SSDs configured as a redundant array of independent disks (RAID).

10. The apparatus of claim 6, wherein the first metadata log is stored in a nonvolatile random access memory (NVRAM) of the host device.

11. The apparatus of claim 6, wherein the host device is configured to store the volume block mapping table in a nonvolatile random access memory (NVRAM) of the host device, wherein the volume block mapping table maps virtual logical block addresses of the one or more SSDs to physical logical block addresses of the one or more SSDs.

* * * * *